(12) United States Patent
Beerwerth et al.

(10) Patent No.: US 7,121,720 B2
(45) Date of Patent: Oct. 17, 2006

(54) PROTECTIVE CAP FOR INFRARED RADIATION THERMOMETER

(75) Inventors: Frank Beerwerth, Runkel-Ennerich (DE); Bernhard Kraus, Braunfels (DE); Katja Honnefeller, Friedrichsdorf (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 10/617,708

(22) Filed: Jul. 14, 2003

(65) Prior Publication Data

US 2004/0013162 A1 Jan. 22, 2004

Related U.S. Application Data

(63) Continuation of application No. 09/117,724, filed on Aug. 5, 1998, now Pat. No. 6,634,787.

(51) Int. Cl.
*G01K 1/08* (2006.01)
*A61B 5/01* (2006.01)

(52) U.S. Cl. .................. 374/158; 374/208; 374/209; 600/549

(58) Field of Classification Search ................ 374/158, 374/121, 208, 120, 209; 600/474, 184, 186, 600/549
See application file for complete search history.

(56) References Cited

U.S. PATENT DOCUMENTS

| | | | | |
|---|---|---|---|---|
| 2,083,596 A | * | 6/1937 | Donley, Sr. ................. 138/144 |
| 3,561,570 A | * | 2/1971 | Sundermann ............ 188/322.5 |
| 3,581,570 A | | 6/1971 | Wortz et al. |
| 3,785,483 A | * | 1/1974 | Sillay ....................... 242/160.4 |
| 3,878,836 A | | 4/1975 | Twentier ..................... 600/200 |
| 4,179,699 A | * | 12/1979 | Lunden ....................... 343/872 |
| 4,397,797 A | * | 8/1983 | Nojiri et al. ................ 264/45.5 |
| 4,602,642 A | | 7/1986 | O'Hara et al. .............. 600/474 |
| 4,775,586 A | * | 10/1988 | Bohrn et al. ................. 428/324 |
| 4,863,281 A | * | 9/1989 | Suszynski ................... 374/158 |
| 4,980,114 A | * | 12/1990 | Satake et al. ............. 264/288.4 |
| 5,017,018 A | * | 5/1991 | Iuchi et al. .................. 374/130 |
| 5,018,872 A | * | 5/1991 | Suszynski et al. .......... 374/133 |
| 5,176,235 A | * | 1/1993 | Williams .................... 192/58.4 |
| 5,255,979 A | * | 10/1993 | Ferrari ....................... 374/158 |
| 5,348,397 A | * | 9/1994 | Ferrari ....................... 374/185 |
| 5,381,796 A | | 1/1995 | Pompei ...................... 600/474 |
| 5,469,855 A | | 11/1995 | Pompei et al. ............. 600/474 |
| 5,871,279 A | * | 2/1999 | Mooradian et al. ......... 374/130 |
| 5,906,437 A | * | 5/1999 | Lin ............................. 374/158 |
| 6,042,266 A | * | 3/2000 | Cheslock et al. ........... 374/158 |
| 6,129,673 A | * | 10/2000 | Fraden ....................... 600/474 |
| 6,156,148 A | * | 12/2000 | Beerwerth et al. .......... 156/256 |
| 6,455,602 B1 | * | 9/2002 | Maki et al. ................. 521/136 |
| 6,609,823 B1 | * | 8/2003 | Kraus et al. ................ 374/131 |

(Continued)

FOREIGN PATENT DOCUMENTS

EP 0411121 12/1988

(Continued)

*Primary Examiner*—Gail Verbitsky
(74) *Attorney, Agent, or Firm*—Morgan, Lewis & Bockius LLP

(57) ABSTRACT

The invention is directed to a protective cap (2) for a temperature measurement probe (30) of an infrared radiation thermometer (1) that can be introduced into a body cavity (31). The protective cap (2) is comprised of a base body (12) shaped to fit the body cavity (31) and having a window (15) transparent to infrared radiation. The base body (12) is provided with additional structures (13; 18, 20) at least in parts to improve heat insulation between the temperature measurement probe (30) and the body cavity (31). This heat insulation of the temperature measurement probe (30) prevents measurement errors by the infrared radiation thermometer (1).

26 Claims, 3 Drawing Sheets

U.S. PATENT DOCUMENTS

| | | | |
|---|---|---|---|
| 6,719,687 B1* | 4/2004 | Van Der Weegen | 600/184 |
| 6,751,497 B1* | 6/2004 | Fraden | 600/474 |
| 2003/0016728 A1* | 1/2003 | Gerlitz | 374/121 |
| 2005/0002437 A1* | 1/2005 | Fraden | 374/121 |

FOREIGN PATENT DOCUMENTS

| | | |
|---|---|---|
| EP | 0419100 | 3/1991 |
| EP | 0472490 | 2/1992 |
| EP | 0637430 | 2/1995 |
| EP | 0674162 | 9/1995 |
| EP | 1308475 A2 * | 5/2003 |
| FR | 2755162 A1 * | 10/1996 |
| GB | L142494 * | 2/1969 |

* cited by examiner

PROTECTIVE CAP FOR INFRARED RADIATION THERMOMETER

This is a continuation of application application Ser. No. 09/117,724, filed on Aug. 5, 1998 now U.S. Pat. 6,634,787.

This invention relates to a protective cap for an infrared radiation thermometer according to the prior-art portion of patent claim 1.

Infrared radiation thermometers are used for measuring body temperature. Typically, such a radiation thermometer includes a housing with a window admitting radiation, an internal optic system and an infrared sensor that is associated with an evaluation unit. The window admitting radiation serves to close off the interior of the housing of the radiation thermometer, thereby protecting the optic system and the sensor from contamination and destruction.

As an additional protection, protective caps of the type initially referred to are seated onto the end of the thermometer; such protective caps are described, for example, in EP-B1-0 201 790, U.S. Pat. No. 5,179,936 or U.S. Pat. No. 5,293,862. These protective caps not only serve the function of protecting the infrared transmitting window, but also are intended to prevent the transmission of diseases to the user, which is accomplished in that a new protective cap is installed prior to each temperature being taken or prior to each measurement—and this also in cases where different persons are involved. The disposable speculum as referred to in EP-B1-0 201 790, U.S. Pat. No. 5,179,936 or U.S. Pat. No. 5,293,862 is fitted over the ear canal probe of a tympanic thermometer that is sensitive to infrared radiation, this disposable speculum having an infrared transmitting membrane made of polypropylene or polyethylene. The portion carrying the membrane is an injection-molded part.

To determine a person's body temperature, the forward end of the temperature measurement probe is inserted into the ear. The infrared radiation emitted by the tympanic membrane and by the ear canal enters the thermometer through the window and is incident, via the optic system or an optical waveguide and an interference filter, on the infrared sensor. The increase in temperature produced in the sensor results in an electrical output voltage from which the radiation temperature can be determined by means of an evaluation unit.

In such devices it has however shown that during measurement a temperature gradient occurs within the thermometer's optic system due to contact of the ear with the thermometer's generally cooler optic system, from which gradient a measurement error results usually. Moreover, the ear canal is subject to cooling by the thermometer. Because the thermometer detects also the infrared radiation of the ear canal or some other body cavity receiving the radiation thermometer, a further source of error results.

Proceeding from the state of the art referred to in the foregoing and the attendant problems of potential measurement errors, it is an object of the present invention to provide a protective cap protecting the user of such an infrared thermometer against the transmission of diseases, in addition to preventing the thermometer's optic system from contamination. It is a still further object to avoid or at least substantially reduce the measurement errors of the type described in the foregoing that occur with conventional clinical thermometers equipped with protective cap.

In a protective cap of the type initially described, the foregoing object is attained according to a first invention by the characterizing features of claim 1. Additional structures provide for insulation of precisely that portion of the base body that is in the immediate vicinity of the window and hence in intimate contact with the wall of the body cavity as, for example, the ear canal, in such fashion that in this particular portion the transfer of heat to the infrared optic system is reduced or maintained at such a low level as to be negligible as regards its effect on the temperature measurement. Because the thermal insulation of the protective cap reduces the passage of heat outside the window, the cooling of, for instance, the ear canal is also diminished at the same time. This has the further effect that by reason of the diminished cooling effect on the ear the user has the impression that the thermometer with this protective cap is warmer and hence substantially less discomforting.

Further, this thermally insulative means may be of a soft configuration, being more pleasant in the ear than a firm, non-pliant material or a protective cap sheathed with such a material. A further particular advantage of such a protective cap is to use it in conjunction with a clinical thermometer having a small probe tip. A clinical thermometer with a small probe tip is suitable for taking both an adult's and a child's temperature if the protective cap of thermally insulating material is made available in at least two sizes. However, such a protective cap may also be fabricated from a particularly soft, thermally insulating and hence elastic material which conforms itself to both an adult's and a child's ear canal, in spite of the size difference. According to the present invention, protective caps of this type are typically utilized as disposable protective caps.

To enable ease and nevertheless accuracy of positioning of the protective cap in the ear canal, but also to avoid different thermal effects due to different positions, at least the base body's outer surface that comes into contact with the ear canal or also the base body's entire outer surface outside the window area should be provided with the thermally insulative means. Such a configuration of the surface of the protective cap ensures at all times an adequate thermal insulation against the temperature measurement probe in the different positions of the clinical thermometer.

A further possibility for increasing the thermal insulation of the temperature measurement probe of the radiation thermometer includes providing the entire base body outside the window with thermally insulative means, that is, not only its outside but also its inside. With such an approach it is possible to prevent the thickness of the outer layer on the base body of thermally insulative means from becoming excessively thick, in addition to enabling the thermally insulative means on the inside to be dimensioned and set to an elasticity in such fashion as to achieve at the same time a clamping and yet detachable mounting of the protective cap on the end of the radiation thermometer.

The base body may at the same time serve as a stable support for the thermally insulating material which is affixed at least on the outside. A soft, porous foamed plastic material is preferably used as the thermally insulative means of the additional structure (claim 2).

Another preferred possibility resides in that the additional structure according to claim 3 is a body that is formed of one or several air chambers.

The features of claim 4, enhance the thermal insulation effect still further. Preferably, in the protective cap structure comprising one or several air chambers, a flexible outer film is applied to the outside claim 5). Such an outer film forms at the same time a smooth outer surface offering little possibility for contaminants to collect and deposit during storage and stockkeeping of the protective caps.

As flexible outer film materials bounding, for instance, the air chamber or the air chambers of a thermally insulative means, polypropylene (PP), polyvinyl or polyethylene (PE)

are proposed (claim 6). For one thing, these are low-cost materials, for another thing, they are easy to process in order to manufacture the thermally insulating bodies, and moreover they are kind to the skin which is an essential aspect for the range of applications of clinical thermometers.

Where the additional structures of the thermally insulative means comprise air chambers, it may be convenient to provide several air chambers that are subdivided by fin members extending radially to the axis of the base body claim 7). While on the one hand this provides for sufficient flexibility of the thermally insulative means conveying a pleasurable feeling to the user, sufficient stability is imparted to the thermally insulative means in any direction on the other hand in order to make sure that the air chambers maintain dimensions sufficient for thermal insulation also in compressed condition. Moreover, the fin members may be formed of foamed plastic material (claim 8) in order to maintain the thermally insulating properties and prevent the formation of heat transfer bridges. Where applicable, the fin members may have apertures to connect adjacent air chambers in a fluid relationship to each other and hence increase the flexibility using a certain damping effect.

Preferably, the window of the radiation thermometer is formed by a window film transparent to infrared radiation or the actual window of the radiation thermometer is covered with such a film (claim 9); in one embodiment, this window film may blend smoothly with a flexible outer film of the thermally insulative means covering the base body. To stabilize the protective cap, a holding device according to claim 10 may be utilized, for example, in the form of an annular body (claim 11) which is attachable, for example, to the rim of the base body (claim 12) and keeps the film smooth.

According to the features of claim 13 ease of manufacture of the protective cap results because it is not necessary to cover the window area during application of the additional structures, but rather, it is equally equipped with thermally insulating material. It is only subsequently that the window is formed by hot pressing, hot stamping or cold stamping. In this process, the air chambers and the foamed plastic material are pressed in such fashion that nearly clear transparent windows are produced.

As preferred material for the base body and the window, polyethylene (PE) or polypropylene (PP) is utilized (claim 14). As preferred material for the additional structures serving as thermally insulative means in the form a thermally insulating foamed plastic, polyethylene (PE), polyvinyl or polyurethane (PU) is utilized, for example (claim 15).

According to a second invention, the object of the present invention is attained by the features of claim 17. In this solution, the protective cap, rather than having a base body, is fabricated only from a thermally insulating material such as foamed plastic or from a plastic material having air chambers. The window's requisite thickness and transparency to infrared radiation are then obtained by hot stamping or cold stamping (claim 18).

Further details and features of the present invention will become apparent from the subsequent description of embodiments with reference to the accompanying drawings. In the drawings, FIG. 1 is a section taken along the axis of an infrared optic system of a radiation thermometer having a protective cap of the present invention installed thereon, with the thermally insulative means of the protective cap being formed of foamed plastic;

Figure 1:
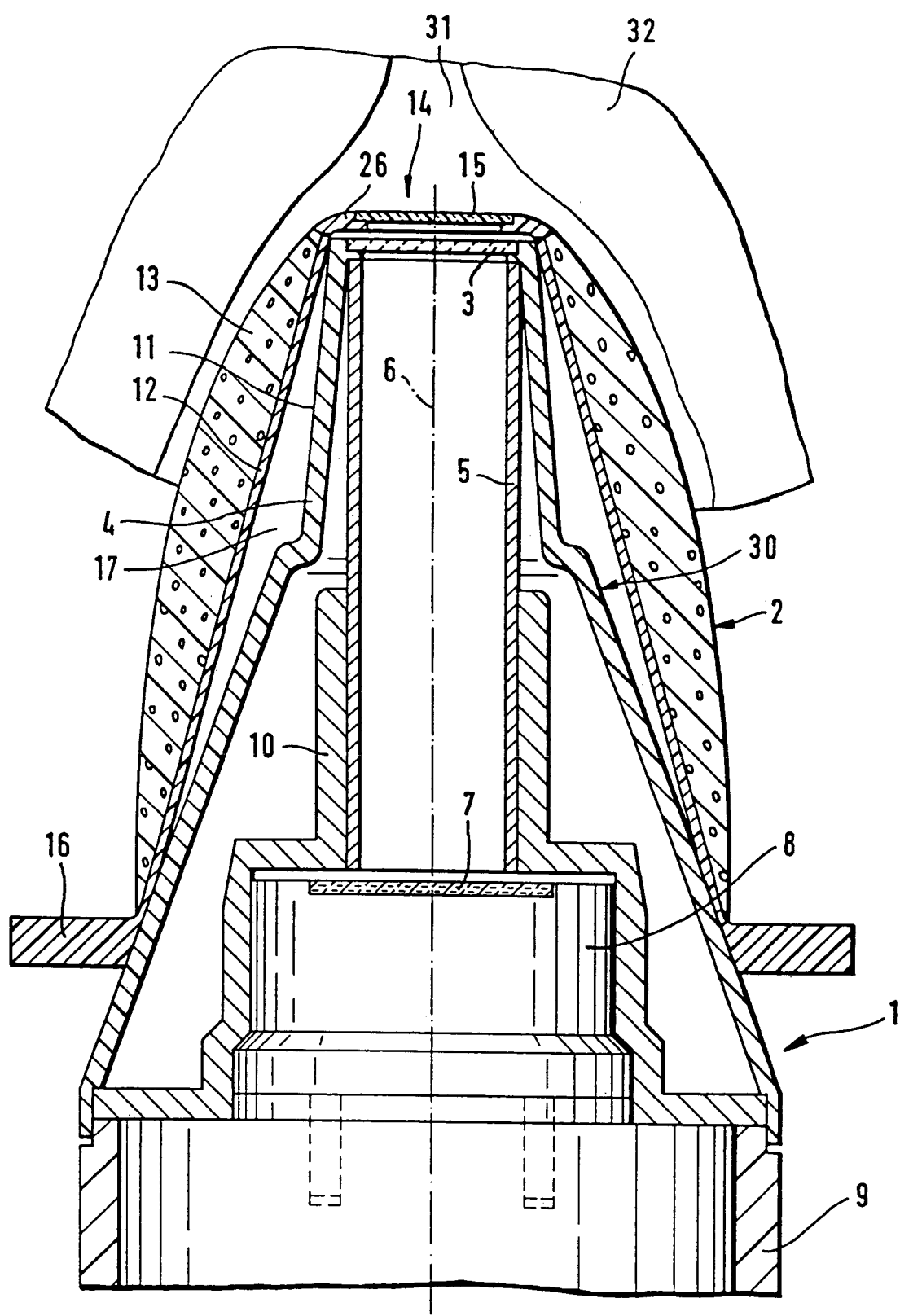

As illustrated in FIG. 1, a protective cap 2 is installed on the forward end of a temperature measurement probe 30 of an infrared radiation thermometer 1 suitable for use as a clinical thermometer 1 in order to protect the probe 30 against contamination and, in addition, to provide for thermal insulation when the probe is inserted into a body cavity 31. In FIG. 1, the body cavity 31 is an ear canal of a person's ear 32 which is, however, only shown schematically.

To take a person's body temperature, the temperature measurement probe 30 is introduced into the ear canal 31 of a user's ear 32. In the absence of a protective cap 2 of a radiation thermometer, the infrared radiation emitted by the tympanic membrane (not shown) and the ear canal 31 passes through a window 3 transparent to infrared radiation in the relevant measurement range at the forward end of the temperature measurement probe 30 and is directed, through an infrared waveguide 5 extending coaxially with the axis 6 of the temperature measurement probe 30 or the protective cap 2 when mounted thereon, to an interference filter 7, entering an infrared sensor 8. The temperature increase produced in the infrared sensor 8 results in an electrical output voltage from which the radiation temperature is derived through an evaluation unit not shown in greater detail, which temperature is indicated to the user as by means of a digital indicating means (not shown) which is accommodated in the housing 9 illustrated only schematically. As becomes apparent from FIG. 1, the waveguide 5 and the infrared sensor 8 with the filter 7 have one end thereof held in a mounting structure 10 which may be manufactured from metal, while their other end is held by a tube 4 of the temperature measurement probe 30, which tube is a push-fit on the housing 9. The tube 4 is preferably fabricated from plastic.

The tube 4 extends slightly conically towards its free end where the window 3 is integrally formed, having a stepped tapered end portion 11 corresponding at its end to the outside diameter of the infrared waveguide 5. By virtue of this tapered end portion 11, the clinical thermometer is suitable for use on both children who have a relatively narrow ear canal 31 and adults who have a wider ear canal 31.

As shown in FIG. 1, the installed protective cap 2 includes a thin-walled tubular base body 12 tapering conically towards its free end and made from a plastic material. In this embodiment, a foamed plastic material 13 serving a thermally insulating-function is affixed to the outside of the base body 12. In a second embodiment which is, however, not shown here, the base body 12 is dispensed with entirely, the protective cap 2 then being only comprised of foamed plastic material 13 or forming a honeycombed air chamber structure.

At its upper free frontal end 14, the protective cap 2 is closed off by an infrared window 15 that is formed of a thin film transparent to infrared radiation in the radiation range relevant for temperature measurement. In FIG. 1, the film forms the base body 12 or is affixed to the base body 12 as a separate member, as by weaving. Where the protective cap is made of foamed plastic only, the film of the window 15 is formed out of the foamed plastic by hot stamping or pressing.

Figure 2:
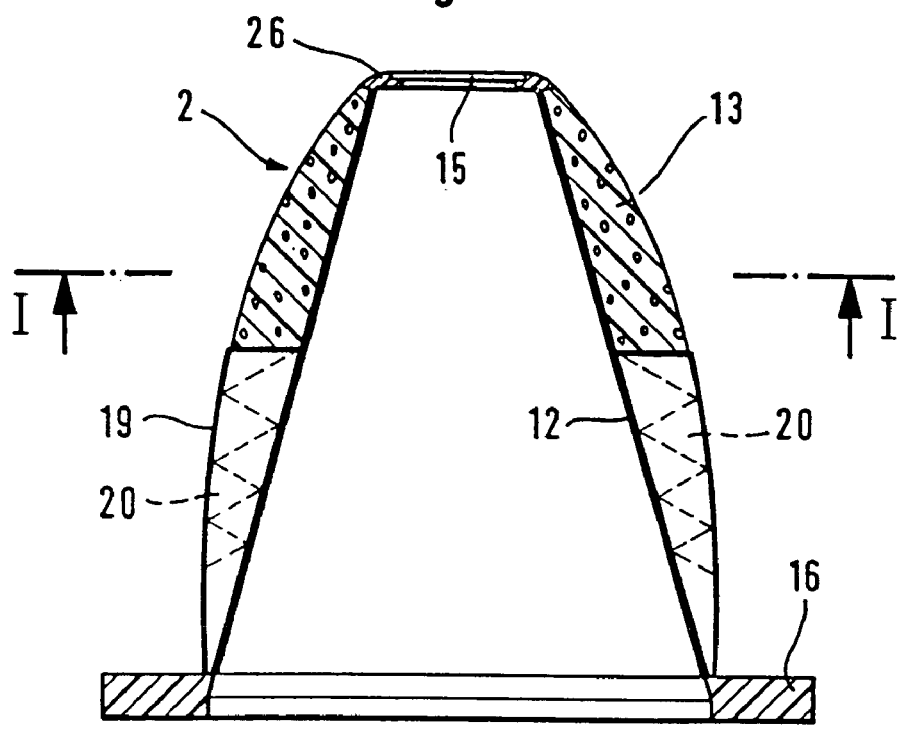
FIG. 2 is another sectional view of a protective cap in which the thermally insulative means of foamed plastic is provided only in the forward portion of the protective cap.
Figure 3:
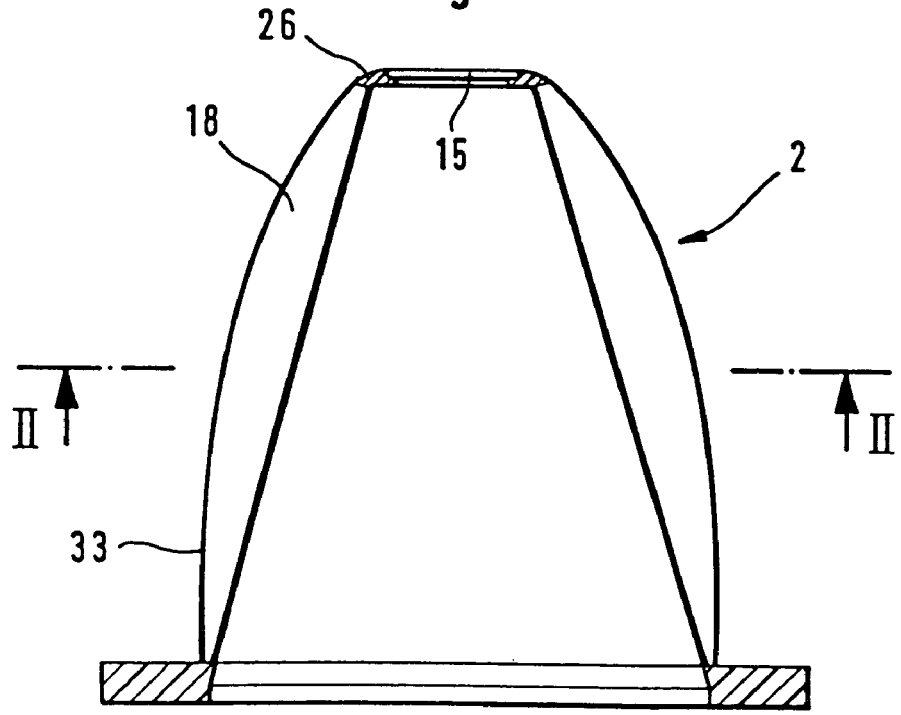
FIG. 3 is a sectional view of a protective cap in which the thermally insulative means is formed by air chambers.

Because of the requirement for such a film 15 to be very thin in order not to affect the measurement result by the material's natural emissions, if any, a problem may present itself in the securing of such a film to the frontal end 14 of the protective cap 2 without wrinkles being formed. To accomplish this, the embodiment shown makes provision for a holding ring 26 which is also shown in the embodiment of FIGS. 2 and 3 and which is clamped upon the leading edge of the base body 12 or is injection-molded with the protective cap 2 in one integral piece. The holding ring 26 may also be made of a different material of higher strength.

In FIG. 1, the protective cap 2 terminates at its lower end in an annular flange 16 engaging in a clamping or snap-action fashion with the outer wall of the temperature measurement probe 30, thereby providing a stiffening and centering function for the protective cap 2. On the inside of the flange 16 and/or on the outside of the tube 4 respective projections and/or recesses, not shown, may be provided, enabling the protective cap 2 to hook onto the outside of the tube 4 in the area of this flange 16 to thereby ensure a secure seat of the protective cap 2 on the temperature measurement probe 30. The flange 16 serves at the same time the function of improving manipulation of the protective cap 2, enabling the user to grasp the cap by its flange 16 and install it over the forward end of the temperature measurement probe 30; by gripping it by the annular flange 16, the protective cap 2 readily disengages again from the projections or recesses.

The thermally insulating foamed plastic material 13 of the protective cap 2 of FIG. 1 has its maximum wall thickness approximately mid-way between the frontal end 14 and the annular flange 16. At least in its upper portion which covers the tapered end portion 11 of the tube 4, it is desirable for the base body 12 to exhibit a certain flexibility enabling it to deform towards the axis 6 such as to be almost engageable with the outer wall of this end portion 11 of the tube 4, particularly on insertion into a narrow ear canal such as a child's. When the temperature measurement probe 30 of this thermometer 1 with the protective cap 2 installed is inserted into a wide ear canal, the base body 12 remains approximately in the position shown in FIG. 1, in which case only the elasticity of the soft foamed plastic material 13 and the penetration depth of the temperature measurement probe 30 in the ear canal 31 perform an adaptation to the ear canal.

However, the possibility also exists to dimension protective caps 2 such that their base body 12 has an outer shape as predetermined by the tube 4. Preferably, such protective caps 2 with such a tapered end can be installed on the thermometer 1 only if the thermometer 1 is used for taking a child's temperature. In this event, there is no need to make allowance for a free space 17 between the outside of the end portion 11 of the tube 4 and the inside of the base body 12.

The thermally insulative properties of the foamed plastic material 13 prevent the transfer of heat from the ear canal 31 which is at body temperature to the tube 4 which is, as a rule, cooler, such heat transfer would otherwise entail the risk of an insufficiently accurate temperature reading. In consequence, apart from preventing contamination of the window 3 and the outside of the tube 4, the thermally insulative protective cap 2 enhances the accuracy of temperature measurement with the thermometer 1, hence avoiding measurement errors introduced due to the transfer of heat from the ear 32 to the tube 4. For sanitary reasons, the protective cap 2 should be replaced after each measurement.

FIG. 2 shows an embodiment of the protective cap 2 in which the thermally insulative means in the form of the soft, pliant foamed plastic material 13 is only provided in the tapered forward portion, whilst the lower half of the base body 12 which terminates in the annular flange 16 is left uncoated, that is, bare. It may be sufficient to apply the thermally insulating material only to the forward end of the base body 12 because it is substantially the forward end portion of the protective cap 2 that comes to rest against an ear canal 31. Attention should be paid to make sure that the thermally insulative means contain a significant amount of air. For this purpose, a foamed plastic material 13 with wide pores may be utilized, preferably a foamed plastic 13 with closed pores, so that major contaminants are prevented from settling in the foamed plastic material.

Another possibility of providing on the outside of the base body 12 a thermally insulative means containing a significant amount of air is illustrated in FIG. 3. In this embodiment of the protective cap 2 which has essentially the same cross-sectional shape as the protective cap 2 of FIG. 1, an air chamber 18 bounded from outside by a further film or wall 33 is provided on the outside of the base body 12. The elasticity of such a protective cap 2 is adjustable by the pressure applied for filling the chamber 18 with air on the one hand, and by the elasticity of the wall 33 and the base body 12 themselves on the other hand.

The protective cap 2 may have thermally insulative means both in the form of foamed plastic material and in the form of air chambers. Adjoining the outside contour of the foamed plastic body 13 in downward direction is the outer wall 19 of a film combining with the base body 12 to form a lower air chamber 20, so that the thermally insulative means in the upper portion is the foamed plastic material 13, whilst in the lower portion it is formed by one or several (shown in broken lines) air chambers 20.

Figure 4:
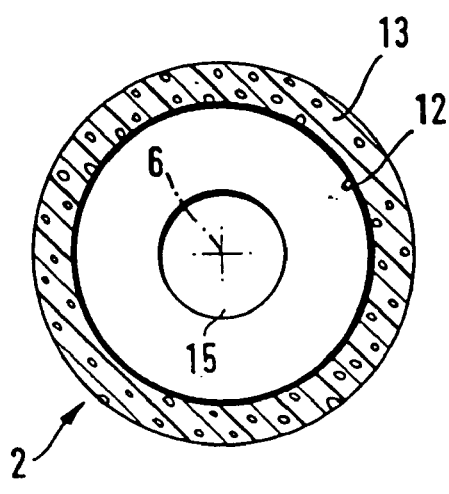
FIG. 4 is a section of the protective cap taken along the line I—I of FIG. 2.
Figure 5:
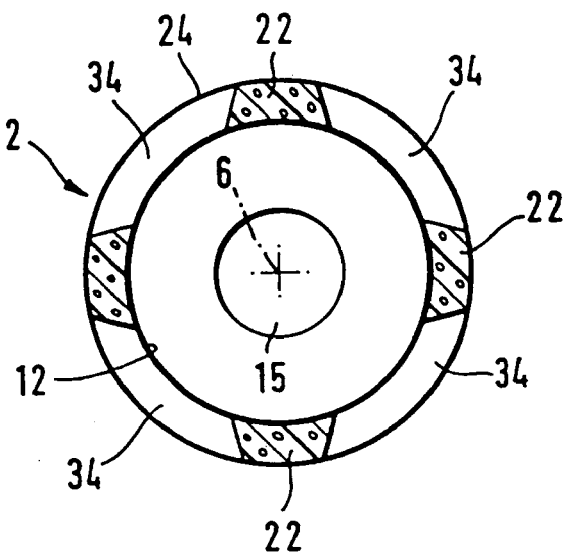
FIGS. 5 to 7 are various sections taken along the line II—II of FIG. 3 perpendicularly to the axis of the protective cap, illustrating various inner structures of the protective cap or the thermally insulative means.
Figure 6:
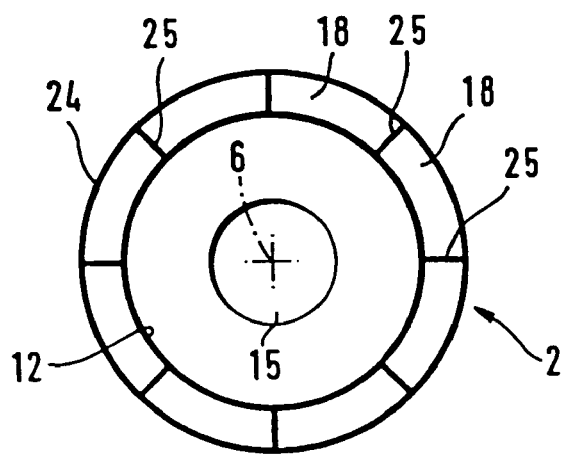
Figure 7:
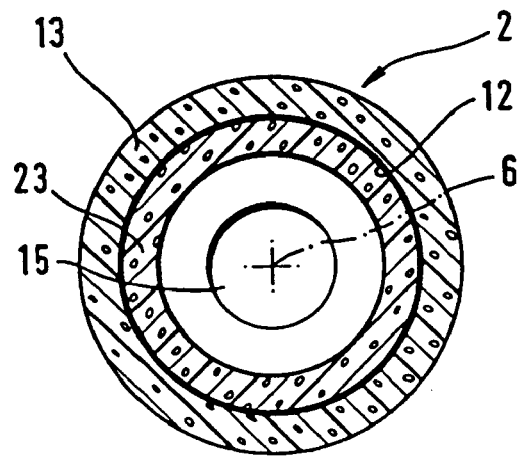

FIGS. 5 to 7 illustrate schematically various sections through the protective caps 2, showing various possibilities for the internal structure in the form of both foamed plastic materials and air chambers, or as combinations of both approaches to function as thermally insulative means. As FIG. 4 shows, it should be understood that the thermally insulative means may be designed in the form of an enclosed foamed plastic body covering the outside of the base body 12, in accordance with the embodiment of FIG. 1 (continuous) and FIG. 2 (in the upper portion only), or as a circumferential air chamber 18 in accordance with the embodiment of FIG. 3.

However, the possibility also exists to cover the base body 12 with foamed plastic fins 22 (FIG. 5) spaced uniformly apart on the base body's circumference and being compressible as the thermometer 1 is introduced in the ear canal 31. The free spaces 34 between the fins 22, whereof four are provided in the embodiment of FIG. 5, then combine with the ear canal 31 (FIG. 1) to form individual air chambers 34. The fins 22 may also be fabricated from a foamed plastic material selected in its strength such as to provide for adequate stiffening of the air chambers 34, thereby preventing the outer wall 24 which bounds the air chambers 34 from resting against the base body 12, while yet being soft and consequently elastic enough to convey a pleasant feeling to the user as the thermometer is inserted in the ear canal.

A further modification is illustrated in FIG. 6. In this modification, the outer wall 24 is connected to the base body 12 by thin, membrane-type fins 25 separating the air chambers 18 from each other. In FIG. 6, a total of eight fins 25 are provided, resulting in a total of eight separate air chambers 18 distributed on the outer circumference of the base body 12. To additionally enhance user comfort, the fins 25 may include apertures not shown, so that adjacent air chambers 18 are in fluid communication with each other to enable a pressure balance to be accomplished between adjacent air chambers 18 and hence improve the mating engagement with the ear canal 31.

FIG. 7 shows a further embodiment in which the protective cap 2 illustrated in FIGS. 1 and 2 has the added provision of a further thermally insulative means 23 equally made of foamed plastic, for example, which is affixed to the inside of the base body 12.

In summary, the protective caps as illustrated in the Figures afford the following advantages:

The protective cap 2 diminishes the adverse effect of heat input into a clinical thermometer, thereby improving the measurement precision of the thermometer 1 or enabling the use of a smaller (or simpler and less costly) thermometer optics with reduced heat insulation and reduced thermal mass.

The protective cap 2 reduces cooling of the ear canal 31 during measurement, thereby enhancing the accuracy of measurement of the thermometer 1 or omitting the need for corresponding compensations.

Due to the reduced cooling of the ear and the soft, elastic protective cap 2, the measurement is appreciably less discomforting for the user, particularly for children.

The soft outside of the protective cap 2 reduces the risk of personal injury.

Used in combination with a clinical thermometer, the protective cap 2 described makes it possible to determine the temperature of children and adults alike speedily without causing pain. Owing to its deformability, the protective cap 2 is capable of conforming itself to different diameters of ear canals 31, enabling an optimum penetration depth and centering of the thermometer 1 in the ear canal 31.

Moreover, the use of protective caps 2 having different outside diameters, for example for children and adults, on the same thermometer 1 is possible.

The integrable holding ring 26 enables the window 3 or the window film 15 of the protective cap 2 to be tensed in a uniform, defined fashion resulting in a uniform transmission. Any undefined tension of the window 3 during mounting of the protective cap 2 is thus avoided.

The invention claimed is:

1. A disposable protective cap for a temperature measurement probe of an infrared radiation thermometer introducible into a body cavity,
the disposable protective cap shaped to fit the body cavity and having a proximal end engaging the temperature measurement probe and a frontal distal end defining a longitudinal central axis therebetween, the distal end terminating in an opening closed by a window transparent to infrared radiation, comprising:
a base body forming an inner wall of said disposable protective cap; and
an outer wall spaced radially apart from said inner wall, said outer wall being permanently attached to the inner wall so as to define at least one airtight chamber between the outer wall and the inner wall.

2. The protective cap as claimed in claim 1, further comprising a soft, porous foamed plastic material disposed between the inner wall and the outer wall.

3. The protective cap as claimed in claim 1, characterized in that the at least one air chamber is formed by foamed plastic having closed pores.

4. The protective cap as claimed in claim 1, characterized in that the at least one air chamber has its outside close to the body cavity bounded by a flexible film.

5. The protective cap as claimed in claim 1, characterized in that the at least one air chamber has its outside bounded by a flexible outer film fabricated from plastic.

6. The protective cap as claimed in claim 1, characterized in that the window is formed of a window film transparent to infrared radiation.

7. The protective cap as claimed in claim 6, characterized in that the window film is stretched tight by a holding device.

8. The protective cap of claim 1, wherein the distal seal is located at or near the distal end of the base body.

9. The protective cap of claim 1, wherein the outer cover has an outwardly convex shape with respect to the longitudinal axis.

10. The protective cap of claim 1, wherein the air chamber is separated into a plurality of chambers.

11. The protective cap of claim 1, wherein the plurality of air chambers are defined by at least one fin member.

12. The protective cap of claim 1, wherein the distal end of the base body includes a foam insulating member.

13. The protective cap of claim 1, wherein the outer wall is made of plastic selected from the group consisting of polypropylene, polyvinyl, and polyethylene.

14. The protective cap of claim 1, wherein the base body is flexible and deforms towards the longitudinal axis when the protective cap is inserted into and contacts the body cavity.

15. A disposable protective cap for a temperature measurement probe of an infrared radiation thermometer introducible into a body cavity, the disposable protective cap shaped to fit the body cavity and having a window transparent to infrared radiation, the disposable protective cap including a proximal end engaging the temperature measurement probe and a frontal distal end defining a longitudinal central axis therebetween, comprising:
base body forming an inner wall of said disposable protective cap; and
an outer wall spaced radially apart from the inner wall, the outer wall being permanently attached to the inner wall so as to define at least one airtight chamber between the outer wall and the inner wall,
and the at least one air chamber is subdivided by a plurality of fin members.

16. The protective cap as claimed in claim 15, wherein the fin members are formed of foamed plastic material.

17. The disposable cap of claim 15, wherein the fin members are connected between base body and outer wall.

18. The disposable cap of claim 15, wherein the fin members are longitudinally oriented.

19. The disposable cap of claim 15, wherein the fin members are made of foamed plastic.

20. The disposable cap of claim 15, wherein the fin members are thin, membrane-type fins.

21. The disposable cap of claim 15, wherein the fins further comprise a plurality of apertures that fluidly connect the air chambers to balance the pressure between adjacent air chambers.

22. The protective cap of claim 15, wherein the outer cover has an outwardly convex shape with respect to the longitudinal axis.

23. A disposable protective cap for a temperature measurement probe of an infrared radiation thermometer introducible into a body cavity comprising:
a generally conical hollow base body of the disposable protective cap having a proximal end and a free frontal distal end defining a longitudinal central axis therebetween, the distal end terminating in an opening closed by a window transparent to infrared radiation, the proximal end terminating in radially outward projecting annular flange releasably engaging the temperature measurement probe;

a flexible outer wall spaced radially apart from the base body;

a proximal circumferential seal permanently joining the base body and the outer wall at or near the proximal end of the base body;

a distal circumferential seal permanently joining the base body and the outer wall at or near the distal end of the base body, the proximal and distal seals defining at least one annular air chamber between the base body and the outer wall to thermally insulate the temperature probe from the body cavity, wherein the base body, outer walls, and proximal and distal seals form a structurally self-supported protective cap that is removeable from the temperature measurement probe and disposable.

24. The protective cap of claim 23, wherein the outer cover has an outwardly convex shape with respect to the longitudinal axis.

25. An apparatus combination of a temperature measurement probe of an infrared radiation thermometer and removable disposable protective cap therefor for measuring body temperature, the combination comprising:

a substantially conical temperature measurement probe for insertion into a body cavity; and a self-supporting disposable protective cap including:

(a) a base body shaped to fit the body cavity and having a proximal end releasably engaging the temperature measurement probe and a frontal distal end defining a longitudinal central axis therebetween, the distal end terminating in an opening closed by a window transparent to infrared radiation; and (b) an outer wall spaced radially apart from the base body, the outer wall defining at least one airtight annular air chamber between the outer wall and base body to thermally insulate the temperature measurement probe from the body cavity.

26. The apparatus combination of claim 25 wherein the at least one annular air chamber is pressurized with air.

* * * * *